United States Patent [19]

Spisz et al.

[11] 4,153,142

[45] May 8, 1979

[54] PAPER FEED TRACTOR LOCKING APPARATUS

[75] Inventors: Albert S. Spisz, Livonia; Daniel J. Woods, Plymouth, both of Mich.

[73] Assignee: Burroughs Corporation, Detroit, Mich.

[21] Appl. No.: 869,835

[22] Filed: Jan. 16, 1978

[51] Int. Cl.$^2$ .............................................. F16D 49/16

[52] U.S. Cl. ........................................ 188/75; 74/531; 188/67

[58] Field of Search ................. 74/502, 503, 531, 532; 188/67, 75

[56] References Cited

U.S. PATENT DOCUMENTS

| | | | |
|---|---|---|---|
| 1,470,007 | 10/1923 | Jenckes | 188/75 UX |
| 2,044,070 | 6/1936 | Ewaldson et al. | 188/75 |
| 2,646,081 | 7/1953 | Ritsky | 188/75 X |
| 3,041,003 | 6/1962 | Kettler | 188/75 X |
| 3,309,116 | 3/1967 | Johnson et al. | 188/67 X |
| 3,502,351 | 3/1970 | Gray | 188/67 X |

*Primary Examiner*—Duane A. Reger

*Attorney, Agent, or Firm*—Carl Fissell, Jr.; Kevin R. Peterson

[57] ABSTRACT

Apparatus for securely locking tractor pin drive apparatus against unintended movement transverse to the movement of the paper being fed by the device comprising a split U-shaped clamping member surrounding an elongated support means carrying the tractor and secured to the tractor body. A flat sided, threaded, bolt having a cam release and locking lever attached to one end and an adjusting self-locking means secured to the other end thereof secures the ends of the U-shaped clamp together. Movement of the lever affords quick cam release of the tractor mechanism with respect to the transverse support by engaging and disengaging the clamp from the support. Adjustment of the bolt alters the degree of clamping force between the clamp and the support.

4 Claims, 5 Drawing Figures

PAPER FEED TRACTOR LOCKING APPARATUS

BACKGROUND OF THE INVENTION

1. Field of the Invention

The invention relates to form feed apparatus of the type wherein pin feed tractor mechanisms are employed to feed relatively wide edge perforated pin hole paper into, through and out of the printer, stacker or other similar device. More particularly, the invention relates to form feed apparatus wherein the tractors are adjustably movable transverse to the line of paper movement.

2. Description of the Prior Art

In printing, feeding and stacking devices of the type employing multilayered sheet material which is provided with lateral perforations in which conveyor belts carrying pin elements engage the holes in the paper to move the paper, it is necessary to be able to laterally adjust such feeding devices to accommodate varying widths of paper; from relatively narrow paper to relatively wide paper. And, because the tractor driving mechanism must be accurately positionable, the tractors must be capable of being locked in position once the desired width has been set. This preset condition should be reasonably fixed so that the paper does not yaw in its travel across the tractor in which case the perforations may tear or the drive may become erratic. In the past a number of different devices have been utilized to secure the tractor mechanism to the transverse moving means each one of which is deficient in one or more particulars. For example, one type utilizes a nut and bolt which has a two part clamp such that adjustment of the nut on the bolt tightens or loosens the clamp. Obviously a problem arises should the operator back off the nut too far in which case the two pieces may fall away from the tractor mechanism. This is not only inefficient and time consuming to adjust but tends to make for non-accurate operation of the tractor due to the need for physical manipulation of parts. Other mechanisms of a similar type have releases coupled with the tractor overlay guide so that when the overlay guide is tilted back to expose the pins of the tractor mechanism for the paper, the clamp releases and the tractor may be moved from side to side. These devices are relatively complex and because of the number of moving parts including springs and cams, tend to get out of adjustment relatively easily; tend to wear and require rather large amounts of maintenance.

The present tractor locking mechanism is relatively simple, does not require any space outside the form feed so that the feed fitted with the device can be moved close up against a housing wall or against the neighboring form feed. The locking element is simple enough that no maintenance is required and the pressure on the transverse support mechanism is relatively easily adjustable for any desired transducer load and any varying types width forms.

SUMMARY OF THE INVENTION

The present invention comprises apparatus for securely locking tractor pin drive apparatus against unintended movement transverse to the movement of the paper being driven by the tractor mechanism and comprises a split unitary U-shaped clamping member which is adapted to surround an elongated transverse support means and is secured to the tractor body. A flat sided, threaded bolt having a cam release and locking lever secured to one end and a self-locking adjustable mechanism to the other end thereof fastens the two ends of the U-shaped clamp together. Movement of the lever provides quick release of the tractor from the support by opening and closing the clamp effectively engaging and disengaging the clamp from the transverse support. Adjustment of the self-locking mechanism adjusts the degree of clamping force between the clamp and the support member.

DESCRIPTION OF A PREFERRED EMBODIMENT

Figure 1:
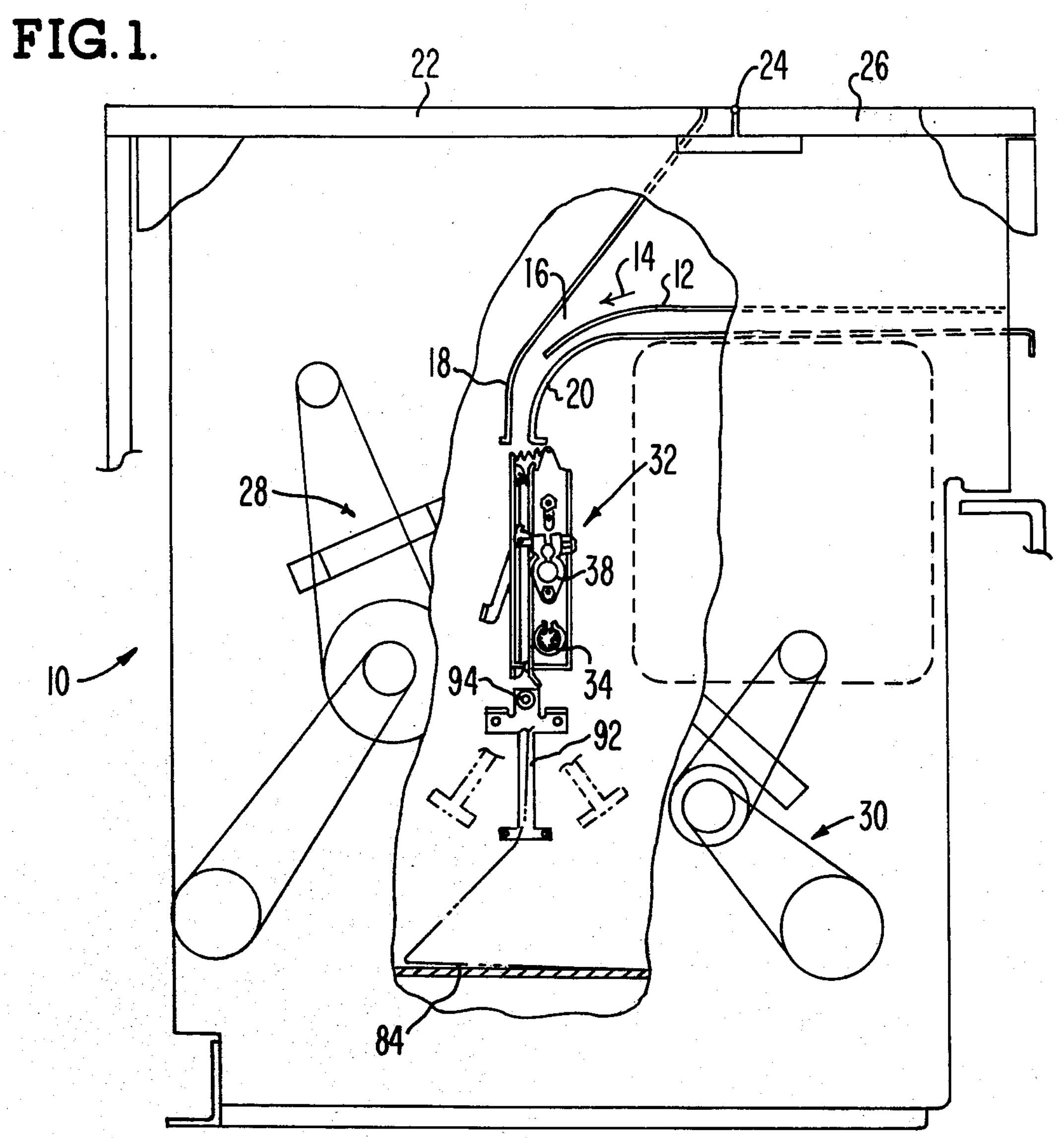
FIG. 1 is a side elevational view of a paper stacking mechanism employing the present invention.

Referring to the drawing, FIG. 1 shows by way of illustration, a multi-ply, high speed, manifold form stacker 10 employing apparatus embodying the present invention. Manifolded forms 12 are adapted to be fed from associated apparatus, e.g. computer printer (not shown) in the direction of arrow 14 into throat 16 formed between the confronting members 18 and 20. Member 18 acts as a downward deflector for the incoming forms and is secured to cover 22 which is hinged as at 24 to cabinet 26 permitting easy access to the forms for start-up, feeding, alignment of forms, inspection of printing, etc.

Figure 2:
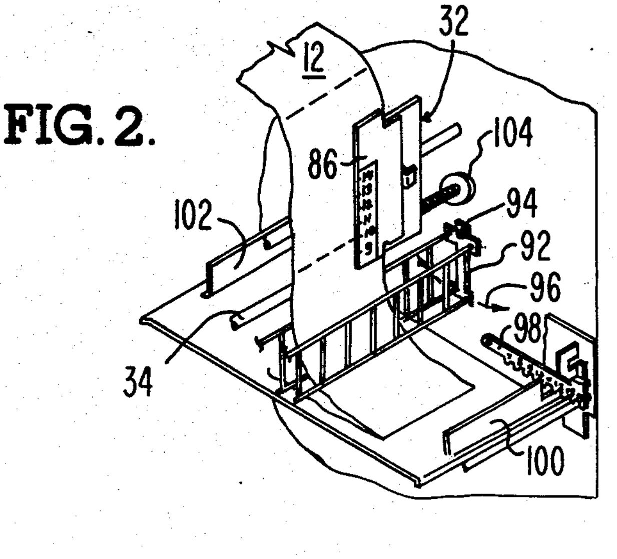
FIG. 2 is an isometric detail view of the tractor locking mechanism in use in the device of FIG. 1.

Various compound driving mechanisms 28 and 30 employed with the stacking apparatus 10 enable a variety of widths of forms to be fed at speeds synchronized with the speed of the printing apparatus with which the present apparatus is utilized with little or no attention by an operator. Tractor apparatus 32 embodying the present invention is located in the path of movement of the form 12 intermediate the side walls and in the usual arrangement there are multiple tractors, for example, at least two tractors spaced and parallel in a side by side relationship. The tractor body is generally positioned at the exit portion of the throat 16 and is vertically oriented with respect to the throat, as seen in FIGS. 1 and 2. Forms 12 enter the throat and upon leaving the throat are engaged by the projecting pins (not shown) of the tractor driving mechanism. The tractor mechanism is driven by means of a splined shaft 34 extending transversely across the path of movement of the incoming paper forms and includes an additional transverse support shaft 36 upon which the tractor device is slidably supported for transverse movement toward and away from the side walls of the stacking mechanism. As seen more clearly in FIGS. 3 through 5 inclusive, the body of the tractor apparatus is long and narrow with the splined driving shaft 34 located at the one end thereof and the smooth surfaced support shaft 36 axially disposed in parallel and separated therefrom slightly above the splined shaft 34.

A split U-shaped clamp 38 surrounds shaft 36 and is secured at one end of the body portion 40 of tractor 32 by means of a bolt 43. The open jaw-like ends of clamp 38 comprise two flat tangs 44—44 bent out of the plane of the base clamp 38, at right angles thereto, and being provided with openings 46 into and through which an elongated bolt 48 extends. One end of bolt 48 is threaded as at 50 and carries a self-locking adjusting means, e.g. a tightening nut 52. The opposite end of bolt 48 is flattened on its inboard side for a portion of its length as at 54, FIG. 3 (i.e. facing toward the body portion 40 of the tractor mechanism) preventing the bolt from turning when the self-locking adjustment, i.e. nut is tightened or loosened.

Figure 3:
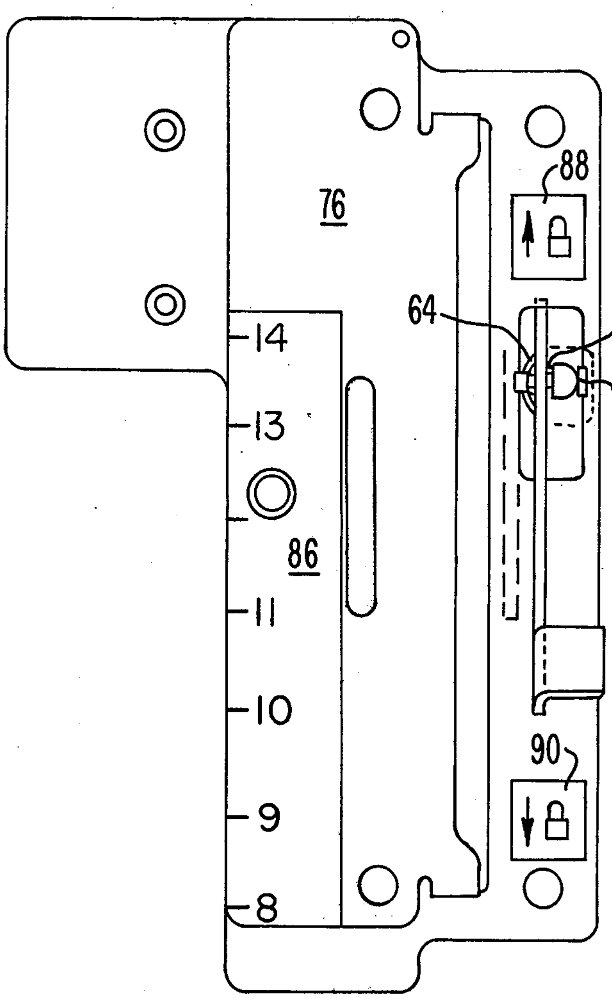
FIG. 3 is an enlarged view in top plan of the tractor locking mechanism of FIG. 1.
Figure 4:
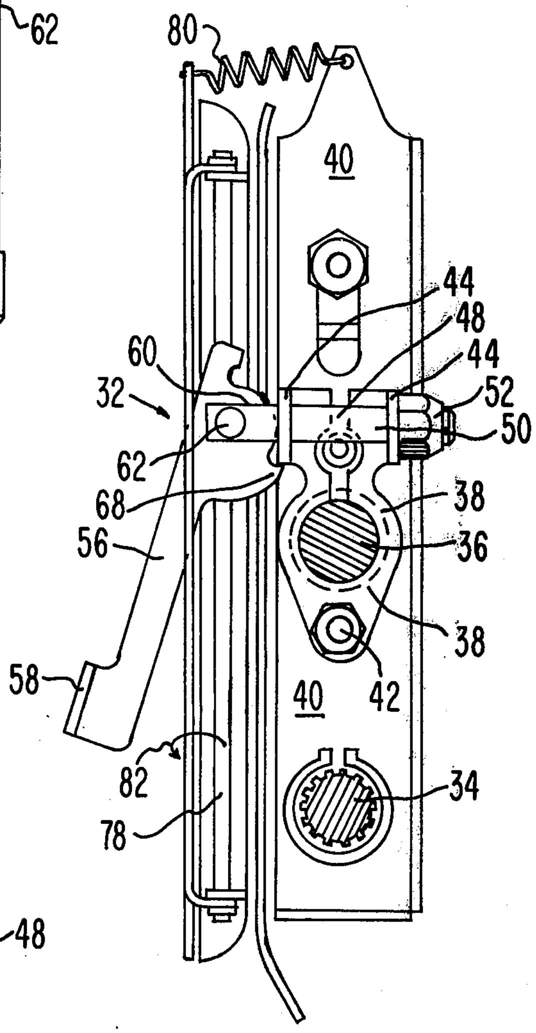
FIG. 4 is a side elevational view, partly in section, illustrating the device of FIG. 1 in the locked position.

A release lever 56 including a bent over handling tang 58 at one end thereof and a curved cam surface 60 at the opposite end thereof is pivoted to bolt 48 by means of stud 62, FIGS. 3 and 4, and retainer 64. Lock and release limits 66 and 68 extend away from the opposite sides of cam surface 60 for purposes which will become apparent hereinafter. Cam surface 60 with opposite high and low portions 70 and 72 respectively is arranged to press against the upper tang 44 of clamp 38 and to move thereagainst in surface contact as the release lever is arcuately moved from the release to the lock position as hereinafter described.

Figure 5:
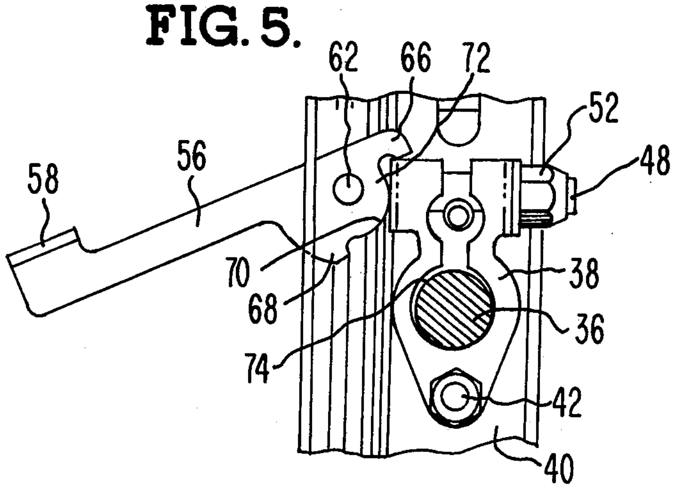
FIG. 5 is an enlarged sectional view of a portion of the mechanism of FIG. 1 showing the locking mechanism in the unlocked position.

As shown in FIGS. 4 and 5, the clamp 38 surrounds and is adapted to grip support shaft 36 along which the tractor mechanism is movable transversely to the direction of movement of the forms or paper. Clamp 38, while not resilient in the ordinary sense, is capable of slight deformation circularly about the shaft 36 as the cam surface 60 rotates against the tang 44 of the clamp. This slight movement is illustrated in the two views of FIGS. 4 and 5 where as in FIG. 5 a peripheral space 74 exists between the inner surface of clamp 38 and the outer periphery of support shaft 36. As lever 56 is raised from the position of FIG. 4 to the position of FIG. 5, the high portion 70 is moved away from tang 44 and the low portion 72 is moved into position against tang 44 so that the clamp is released from its grip around shaft 36 effectively freeing the tractor 32 for movement to the desired position. Conversely, when the tractor has been positioned to its new location lowering lever 56 will move the low portion 72 out of the way and bring the high portion 70 into pressing contact with tang 44 causing the ends of clamp 38 to close and tightly grip the rod 36 (FIG. 4).

Access to the tractor drive elements (not shown) is provided by means of a pivoted cover member 76 which, as seen in FIG. 4, is pivotally mounted to a shaft 78 extending from end to end of the tractor body 40. A spring 80 (in an over-under relationship) biases the cover to a closed or open position, as desired. In the open condition (not shown) cover 76 is raised about pivot 78 as indicated by the two headed arrow 82. The edge perforated form 12 may thus be oriented oer the projecting tractor drive pins (not shown) for straight line movement from the associated printer to a stacking tray, bin or platform 84, FIG. 1.

The exposed face of cover 76 carries an elongated "form size scale" decal 86 bearing certain indicia thereon, e.g. numbers 8 through 14 inclusive, as will be explained hereinafter. Additionally, position decals 88 and 90 indicate the unlocked and locked condition respectively of the tractor release mechanism.

As the form 12 leaves tractor 32, it enters the upper leading end of and is engaged by a rockable swing arm 92 which is arcuately pivoted at 94 and swings back and forth in the direction of arrow 96, FIG. 2, in synchronism with the advancement of each page of the form passing through the stacking apparatus 10.

In order that the forms fanfold properly on the stacking track or in the stacking bin, as the case may be, a pair of complementary adjustments are provided. A lower "length of form" control 98 is located along the lower right hand side of the frame of the stacker and is adjustable according to the physical length of the particular forms being stacked as indicated by the numbers imprinted on the decal along the notched portion thereof. Adjustment is made by the operator lifting the lever and moving the forward guide assembly 100 to the position desired. The rearward guide assembly 102 moves a corresponding amount (of travel) due to the rack and pinion coupling mechanism (not shown) located on opposite lower sides of cabinet 26. Concurrently with the foregoing the "forms size control" 104 secured to the splined shaft 34, is rotatably adjusted to the size number corresponding to the form length number previously set. With the tractor 32, on either side of the forms, adjusted for the proper width of forms, the apparatus is ready to stack. The forms size scale 86 enables the operator to adjust the "internal" fold of the fanfolded form to fold or bend at the correct point in passage through the tractor. This will enable the "external" fold to properly fanfold. Form folding thereafter is automatic with each fold correctly overlying the previous fold in proper sequence.

What is claimed is:

1. Paper feed tractor quick lock and release apparatus adapted to be positioned intermediate the edge perforations of material to be printed comprising, clamping means having a fixed end portion secured to said tractor and an opposite, bifurcated, open end portion terminating in oppositely disposed tangs, the central portion of said clamping means being provided with an opening enabling said clamping means to surround a fixed support member along which said clamping means and said tractor are non-rotatably, slidably movable, tang adjusting means extending between said tangs for varying the degree of frictional gripping force between said clamping means and said support member by varying the opening between said tangs relative to the fixed support member, one end of said tang adjusting means terminating in a flattened area effective to preventive rotative movement of said tang adjusting means while the opposite end of said tang adjusting means threadedly engages means for closing the opening between said tangs causing said clamping means to grip said support member, and snap release handle means rockably disposed adjacent to said flattened area and including a cam surface engaging said tang adjusting means effective in one position of said release means to permit the natural spring force of the material to spread said tangs apart releasing said clamping means and in another position of said release means effective to forceably draw said tangs together so as to clamp said tractor along said support member.

2. The invention in accordance with claim 1 wherein said handle means is pivotally mounted on said flattened area of said tang adjusting means and wherein said cam end of said handle means is effective to open and close said tangs while preventing rotation of said tang adjusting means as the degree of friction is altered.

3. The invention in accordance with claim 1 wherein said tang adjusting means comprises a threaded bolt joining the open tangs of said clamping means and a lock nut rotatably secured thereto for altering the degree of frictional engagement of said clamping means with respect to said support member.

4. The invention in accordance with claim 1 wherein said cam surface further includes oppositely disposed stop means engageable with said tang adjusting means permitting operational snap-release of said clamping means without visual reference to the distal movement of the handle means.

* * * * *